US012598472B2

(12) United States Patent
Jiang et al.

(10) Patent No.: US 12,598,472 B2
(45) Date of Patent: Apr. 7, 2026

(54) DEVICE, METHOD, APPARATUS AND COMPUTER READABLE STORAGE MEDIUM FOR NETWORK SLICING

(71) Applicant: Nokia Solutions and Networks Oy, Espoo (FI)

(72) Inventors: Yi Ming Jiang, Shanghai (CN); Gang Cheng, Shanghai (CN); Zhijie Yang, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 538 days.

(21) Appl. No.: 18/154,913

(22) Filed: Jan. 16, 2023

(65) Prior Publication Data

US 2023/0232241 A1     Jul. 20, 2023

(30) Foreign Application Priority Data

Jan. 18, 2022     (CN) .......................... 202210055170.4

(51) Int. Cl.
*H04W 16/10*          (2009.01)
(52) U.S. Cl.
CPC ................................... *H04W 16/10* (2013.01)
(58) Field of Classification Search
CPC .... H04L 45/302; H04W 16/10; H04W 48/18; H04W 76/12
See application file for complete search history.

(56) References Cited

U.S. PATENT DOCUMENTS

2020/0120721 A1* 4/2020 Lau ........................ H04W 76/11

FOREIGN PATENT DOCUMENTS

| WO | WO-2019036494 A1 * | 2/2019 | ............ H04W 48/14 |
| WO | WO-2019136128 A1 * | 7/2019 | ............ H04W 72/30 |
| WO | WO-2025072221 A1 * | 4/2025 | ........... H04L 41/022 |

OTHER PUBLICATIONS

3GPP TR 28.801 V15.1.0, 3rd Generation Partnership Project; Technical Specification Group Service and System Aspects; Telecommunication Management; Study on Management and Orchestration of Network Slicing for Next Generation Network (Release 15), Jan. 2018, pp. 1-75.

(Continued)

*Primary Examiner* — Shukri Taha
(74) *Attorney, Agent, or Firm* — Harness, Dickey & Pierce, P.L.C

(57) ABSTRACT
In one embodiment, a Network Slice Instance (NSI) management object corresponding to an NSI managed by a core network is acquired at a wireless access device, the NSI management object having wireless network characteristics associated with the NSI; NSI capability information is advertised to a terminal device in a wireless network provided by the wireless access device, the NSI capability information at least indicating whether the wireless network supports a network slicing function; mapping information on the NSI and a transmission tunnel between the terminal device and the core network is received from the terminal device; and data passing through the transmission tunnel are forwarded in the corresponding NSI based on the mapping information, the NSI management object, and the wireless network characteristics associated with the NSI.

24 Claims, 5 Drawing Sheets

(56) References Cited

OTHER PUBLICATIONS

3GPP TR 23.501 V17.2.0, 3rd Generation Partnership Project; Technical Specification Group Service and System Aspects; System Architecture for the 5G System (5GS); Stage 2; (Release 17), Sep. 2019, pp. 1-542.

3GPP TR 22.261 V18.4.0, 3rd Generation Partnership Project; Technical Specification Group Service and System Aspects; Service Requirements for the 5G System; Stage 1; (Release 18), Sep. 2021, pp. 1-107.

3GPP TR 23.502 V17.2.1, 3rd Generation Partnership Project; Technical Specification Group Service and System Aspects; Procedures for the 5G System (5GS); System 2; (Release 17), Sep. 2021, pp. 1-712.

WBA Members, "Network Slicing Understanding Wi-Fi Capabilites," WBA 5G Workgroup, Mar. 2018, pp. 1-15.

Wikipedia TR-069, http://en.wikipedia/org/wiki/TR-069, retrieved on Feb. 17, 2023.

Wikipedia TR-369, https://de.wikipedia.org/wiki/TR-369, retrieved on Feb. 17, 2023.

Wikipedia IEEE 802.11, https://en.wikipedia.org/wiki/IEEE_802. 11, retrieved on Feb. 17, 2023.

Wireless Broadband Alliance, "5G and Wi-Fi RAN Convergence," Industry Guidelines Executive Summary, 2021, pp. 1-8.

* cited by examiner

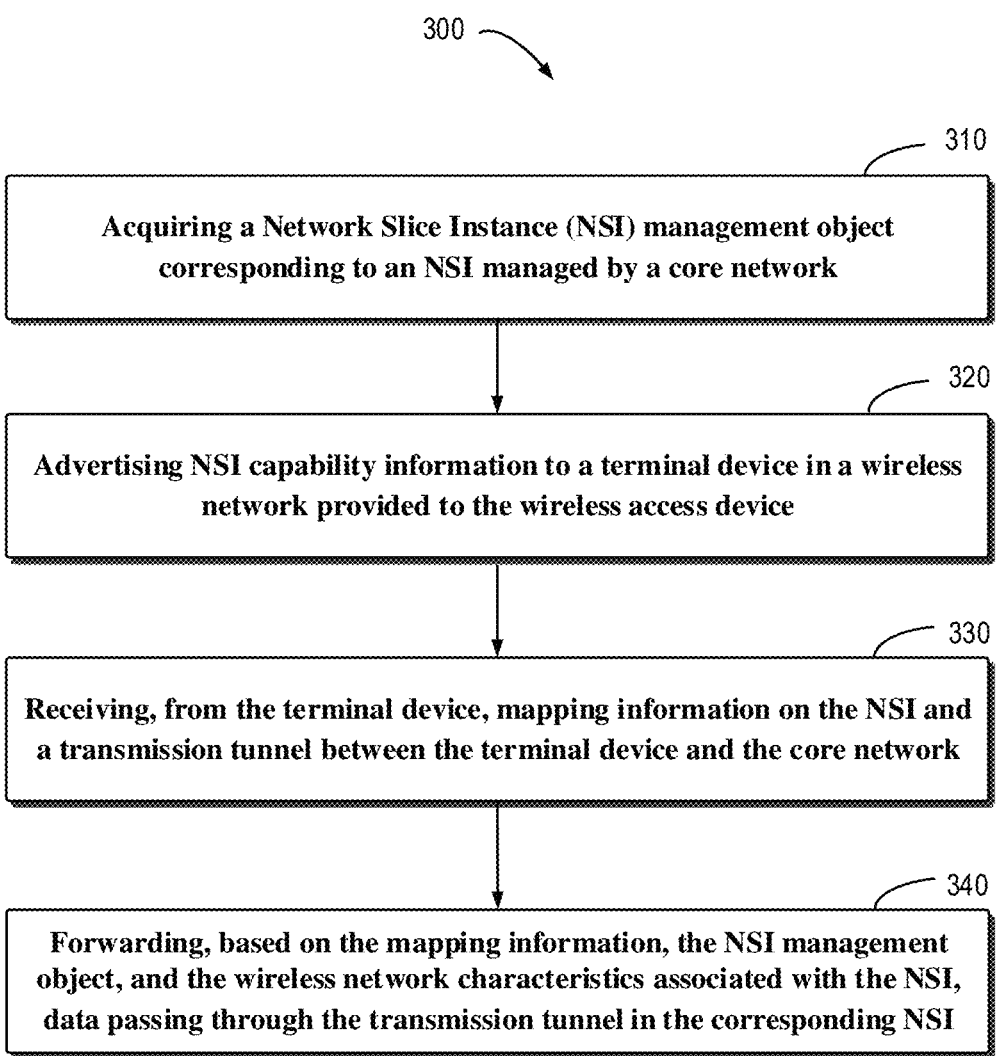

300

310

Acquiring a Network Slice Instance (NSI) management object corresponding to an NSI managed by a core network

320

Advertising NSI capability information to a terminal device in a wireless network provided to the wireless access device

330

Receiving, from the terminal device, mapping information on the NSI and a transmission tunnel between the terminal device and the core network

340

Forwarding, based on the mapping information, the NSI management object, and the wireless network characteristics associated with the NSI, data passing through the transmission tunnel in the corresponding NSI

FIG.3

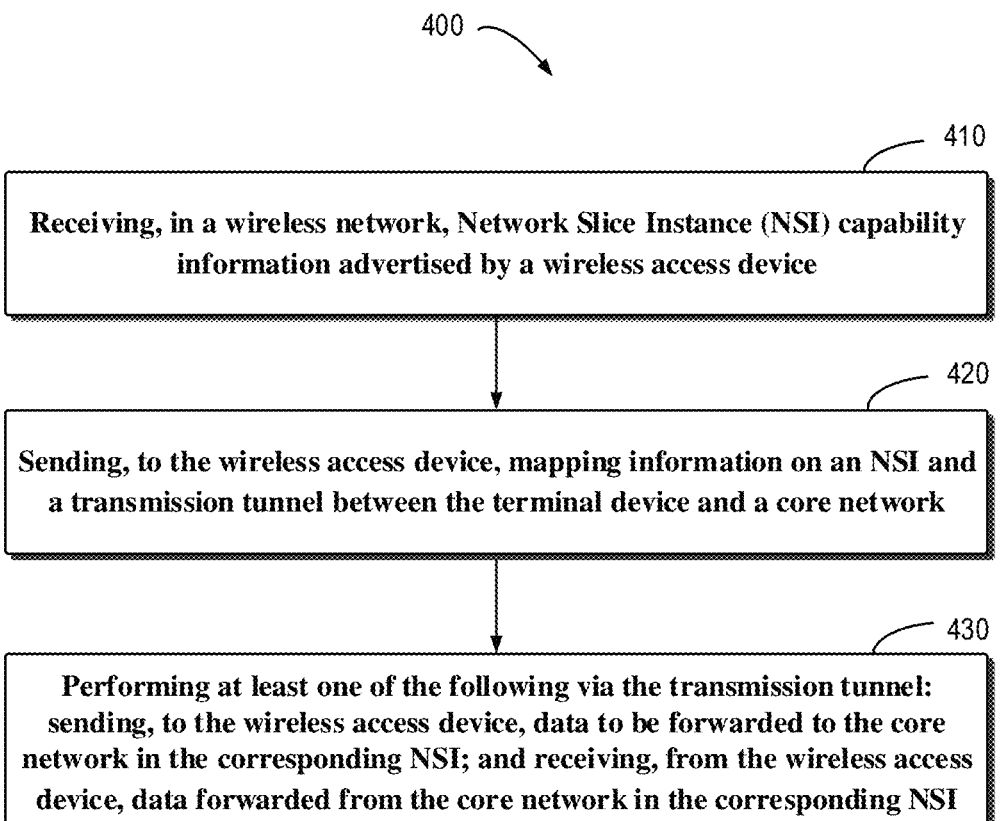

400

410

Receiving, in a wireless network, Network Slice Instance (NSI) capability information advertised by a wireless access device

420

Sending, to the wireless access device, mapping information on an NSI and a transmission tunnel between the terminal device and a core network

430

Performing at least one of the following via the transmission tunnel: sending, to the wireless access device, data to be forwarded to the core network in the corresponding NSI; and receiving, from the wireless access device, data forwarded from the core network in the corresponding NSI

FIG.4

DEVICE, METHOD, APPARATUS AND COMPUTER READABLE STORAGE MEDIUM FOR NETWORK SLICING

CROSS-REFERENCE TO RELATED APPLICATION

This application claims priority under 35 U.S.C. § 119 to Chinese Patent Application No. 202210055170.4, filed on Jan. 18, 2022, in the Chinese Patent Office, the entire contents of which are hereby incorporated by reference.

FIELD

Embodiments of the present disclosure generally relate to communication technologies, and more specifically, to a device, method, apparatus, and computer readable storage medium for network slicing in wireless network.

BACKGROUND

The 5G New Radio (5G NR) network has the characteristics of high transmission rate, low latency, massive interconnection, and the like, and it supports the following typical application scenarios, including enhanced Mobile Broadband service (eMBB), ultra-reliable Low-Latency Communication (urLLC), and massive Machine Type Communication (mMTC). The three application scenarios have different requirements for network services. In order to flexibly combine services and meet different service needs, a network slicing approach is utilized in 5G system architecture to allocate and manage wireless resources. The network slice can be deployed across both the Core Network (CN) and the Access Network (AN) to group dedicated network functions and access resources so as to support specific services.

Non-3GPP convergence in the 5G network is a key element defined in the 5G system architecture. The non-3GPP convergence is to enable a non-3GPP wireless network to access the 5G core network so that 5G applications running over the 5G control plane and data plane services do not need to know a lower layer access network, such as a 5G RAN access network, a non-3GPP network, or the like. The non-3GPP network may be a wireless network based on the 802.11 standards, for example, a Wi-Fi access network. Currently, the network slice framework does not cover Wi-Fi access segments in the 5G convergence network. In the non-3GPP convergence architecture, the traffic flow of the data plane is encapsulated in an IPsec tunnel between a UE and an NSIWF (a non-3GPP Interconnect Function) or a TNGF (a trusted non-3GPP gateway function). Since the IPsec tunnel is transparent in the Wi-Fi network, Wi-Fi access AP devices have no available information related with 5G data plane PDU sessions, thus making it impossible to ensure the PDU session traffic flows forwarded in the corresponding network slice in the Wi-Fi network.

SUMMARY

In general, embodiments of the present disclosure provide a device, method, apparatus, and a computer readable storage medium for providing a service to a user.

In a first aspect, the embodiments provide a wireless access device. The wireless access device comprises at least one processor and at least one memory having computer program codes. The at least one memory and the computer program codes being configured, together with the at least one processor, to cause the wireless access device to: acquire a Network Slice Instance (NSI) management object corresponding to an NSI managed by a core network, the NSI management object having wireless network characteristics associated with the NSI; advertise NSI capability information to a terminal device in a wireless network provided to the wireless access device, the NSI capability information at least indicating whether the wireless network supports a network slicing function; receive, from the terminal device, mapping information on the NSI and a transmission tunnel between the terminal device and the core network; and forward, based on the mapping information, the NSI management object, and the wireless network characteristics associated with the NSI, data passing through the transmission tunnel in the corresponding NSI.

In a second aspect, the embodiments of the present disclosure provide a terminal device. The terminal device comprises at least one processor and at least one memory having computer program codes. The at least one memory and the computer program codes being configured, together with the at least one processor, to cause the terminal device to: receive, in a wireless network, Network Slice Instance (NSI) capability information advertised by a wireless access device, the NSI capability information at least indicating whether the wireless network supports a network slicing function; send, to the wireless access device, mapping information on an NSI and a transmission tunnel between the terminal device and a core network, the NSI having associated wireless network characteristics; and perform at least one of the following via the transmission tunnel: sending, to the wireless access device, data to be forwarded to the core network in the corresponding NSI; and receiving, from the wireless access device, data forwarded from the core network in the corresponding NSI.

In a third aspect, the embodiments of the present disclosure provide a method for communication. The method comprises: acquiring, at a wireless access device, a Network Slice Instance (NSI) management object corresponding to an NSI managed by a core network, the NSI management object having wireless network characteristics associated with the NSI; advertising NSI capability information to a terminal device in a wireless network provided to the wireless access device, the NSI capability information at least indicating whether the wireless network supports a network slicing function; receiving, from the terminal device, mapping information on the NSI and a transmission tunnel between the terminal device and the core network; and forwarding, based on the mapping information, the NSI management object, and wireless network characteristics associated with the NSI, data passing through the transmission tunnel in the corresponding NSI.

In a fourth aspect, the embodiments of the present disclosure provide a method for communication. The method comprises: receiving, at a terminal device in a wireless network, Network Slice Instance (NSI) capability information advertised by a wireless access device, the NSI capability information at least indicating whether the wireless network supports a network slicing function; sending, to the wireless access device, mapping information on an NSI and a transmission tunnel between the terminal device and a core network, the NSI having associated wireless network characteristics; and performing at least one of the following via the transmission tunnel: sending, to the wireless access device, data to be forwarded to the core network in the corresponding NSI; and receiving, from the wireless access device, data forwarded from the core network in the corresponding NSI.

In a fifth aspect, the embodiments of the present disclosure provide an apparatus for communication. The apparatus comprises components for performing the method according to the third aspect.

In a sixth aspect, the embodiments of the present disclosure provide an apparatus for communication. The apparatus comprises components for performing the method according to the fourth aspect.

In a seventh aspect, the embodiments of the present disclosure provide a computer-readable storage medium having a computer program stored thereon. The computer program comprises an instruction which, when executed by a processor on a device, causes the device to perform the method according to the third aspect.

In an eighth aspect, the embodiments of the present disclosure provide a computer-readable storage medium having a computer program stored thereon. The computer program comprises an instruction which, when executed by a processor on a device, causes the device to perform the method according to the fourth aspect.

It would be appreciated that the Summary is not intended to restrict key features or essential features of the present disclosure, nor is it intended to be used to limit the scope of the present disclosure. Other features of the present disclosure will be made apparent by the following depictions.

BRIEF DESCRIPTION OF THE DRAWINGS

Reference will now be made to the drawings to describe some example embodiments, where:

FIG. 3 illustrates a flowchart of a method for communication according to some embodiments of the present application;

FIG. 4 illustrates a flowchart of a method for communication according to some embodiments of the present application;

Throughout the drawings, the same and similar reference symbols represent the same and similar elements.

DETAILED DESCRIPTION OF EMBODIMENTS

Figure 1:
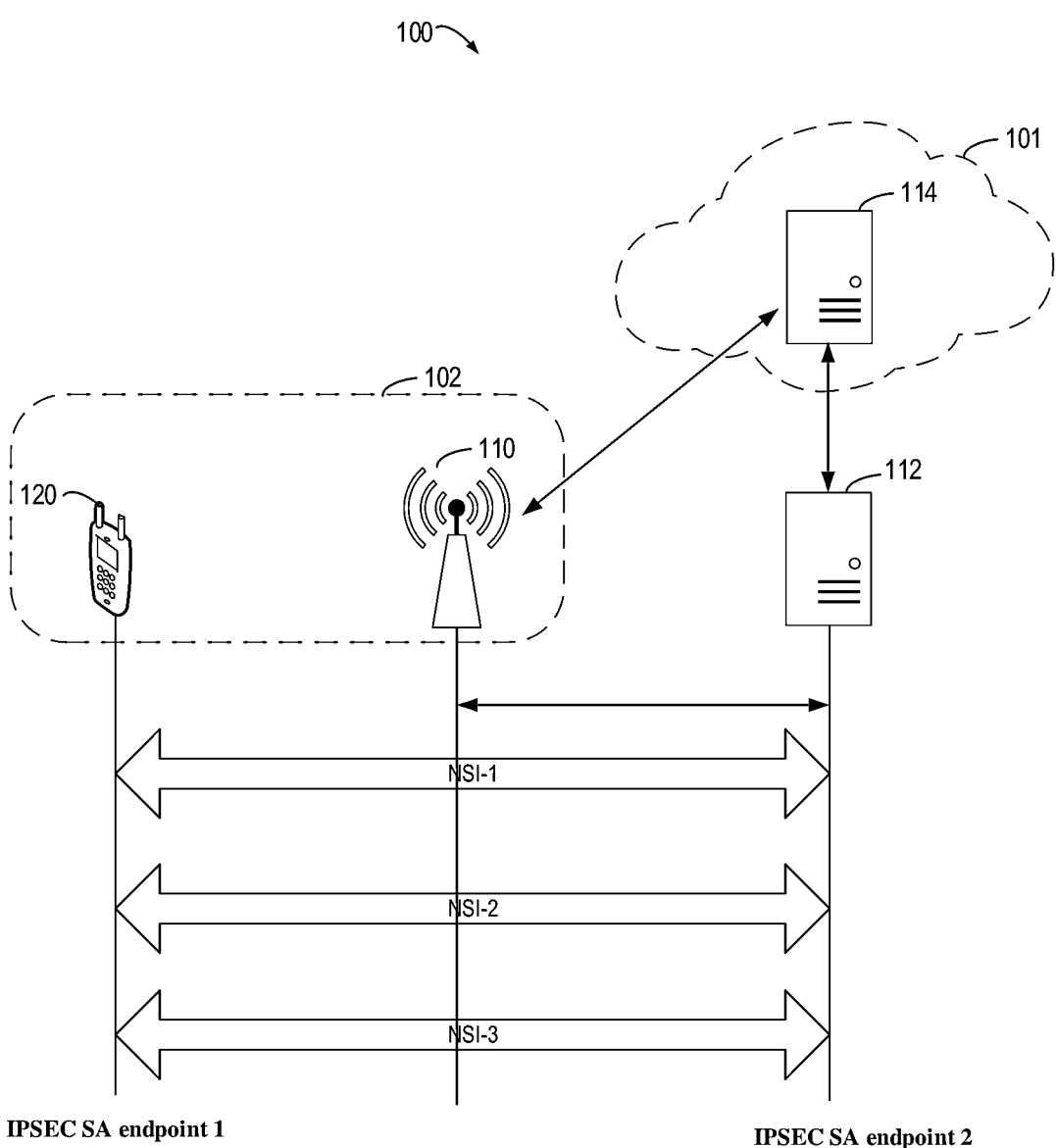
FIG. 1 illustrates an example network environment where example embodiments of the present disclosure can be implemented.

Hereinafter, reference will be made to the drawings to describe in detail preferred embodiments of the present disclosure. Although the preferred embodiments of the present disclosure are shown in the drawings, it would be appreciated that the present disclosure could be carried out in various forms, rather than being confined to the embodiments illustrated herein.

Rather, those embodiments are provided only to make the present disclosure more thorough and complete, and to convey the scope of the present disclosure fully to those skilled in the art.

As used herein, the term "includes" and its variants are to be read as open-ended terms that mean "includes, but is not limited to." The term "or" is to be read as "and/or" unless indicated otherwise. The term "based on" is to be read as "based at least in part on". The term "an example embodiment" and "some embodiments" are to be read as "at least one example embodiment". Other definitions explicit or implicit may be covered below.

As used herein, the term "circuitry" refers to one or more of the following:

(a) a hardware-only circuitry implementation (e.g. an analog- and/or digital-only circuitry implementation); and (b) a combination of hardware circuitry and software, for example, (if applicable): (i) a combination of analog and/or digital hardware circuitry and software/firmware, and (ii) any part of a hardware processor and software (including a digital signal processor, software and a memory operating together to cause an apparatus, such as an OLT, DPU, or other computing device, to implement various functions); and (c) hardware circuitry and/or a processor, such as a microprocessor or a part thereof, which needs software (e.g. firmware) for operation, but may leave out software if the software is not necessary for operation.

The definition of the circuitry is applicable to all use scenarios of the present disclosure (including any one of the claims). As another example, the term "circuitry" used herein also covers an implementation of hardware circuitry or a processor (or a plurality of processors), a part of hardware circuitry or a processor, or software or firmware attached thereto. For example, if applied to a particular element in the claims, the term "circuitry" further covers a baseband integrated circuit, processor integrated circuited, OLT and DPU, or similar integrated circuitry in other computing device.

As used herein, the term "wireless access device" or "wireless Access Point (AP)" refers to a device that provides wireless network coverage within a certain region using a wireless communication technology. The wireless communication technology is typically defined according to the IEEE 802.11 set of standards. By way of non-limiting examples, the wireless access device may include a Wi-Fi AP, hot spot, router, and the like.

As used herein, the term "terminal device" includes any suitable device having a wireless communication capability. By way of non-limiting examples, such device may be, for example, a User Equipment (UE), mobile phone, smart phone, notebook computer, PDA (Personal Digital Assistant), PMP (Portable Multimedia Player), and the like. In context of the present disclosure, the core network may provide a service to a terminal device in the wireless network via a wireless access device. For ease of discussion, in some embodiments, the UE is taken as an example of the terminal device.

Typical application scenarios of a 5G network slice includes:

grouping dedicated network functions and network resources which will be used by a separate service operator in the B2B operation model; and creating a dedicate network slice cross an access network and a 5G core network for a specific type of services for one service operator in the B2C operation model, wherein the specific type of services could be, for example, an online gaming service sensitive for latency, online video service sensitive for bandwidth, or the like.

The 5G data plane PDU sessions created are mapped to a corresponding network slice and will be forwarded in the E2E network slice cross the 5G radio or non-3GPP Wi-Fi access network and the 5G core network, to guarantee network characteristics indicated for the corresponding network slice.

In the 5G system architecture, the network slice framework is defined cross a 5G core network, 5G Radio Access Network (RAN), Non-3GPP Inter-Working Function (N3IWF) for an untrusted non-3GPP access case in a 5G convergence network, and a Trusted Non-3GPP Gateway Function (TNGF) for a trusted non-3GPP access case in the 5G convergence network.

The non-3GPP network is widely deployed worldwide for home local area network and public local area network scenarios and so on. The non-3GPP network may be a wireless network based on the 802.11 standards, for example a Wi-Fi network. The Wi-Fi technology has been developed to the 6$^{th}$ generation of the wireless network technology (i.e., Wi-Fi 6), which can support the maximum throughput up to 9.6 gbps and support the latency lower than 10 ms. Nevertheless, the network slicing framework defined currently does not cover Wi-Fi segments in a 5G convergence network. As stated above, the traffic flow of the 5G data plane is encapsulated in an IPsec tunnel between a UE and a N3IWF or TNGF, and the IPsec tunnel is transparent in the Wi-Fi network. Accordingly, the Wi-Fi AP devices do not have available information related to the 5G network slices created in the 5G network, thus failing to ensure that the PDU session traffic be forwarded in a corresponding network slice in a Wi-Fi access network, and thus failing to guarantee the network characteristics required by the E2E network slice data plane in the 5G convergence network.

In order to solve the above-mentioned problem and other potential problems, the embodiments of the present disclosure provide a technical solution of supporting network slicing in a wireless network. In the solution, a Network Slice Instance (NSI) management object aligned with the core network is created and managed on a wireless access point so that the wireless access point can know the network characteristics of a 5G slice and reserve network resources based on the NSI network characteristics. As such, the end-to-end slicing solution can be attained, and requirements of different services on service quality, latency, transmission bandwidth, and the like can also be satisfied. In addition, the wireless access point can advertise its slicing capability information to a terminal device in a wireless network. In this way, the terminal device can select, based on the slicing capability information, a wireless network to be accessed. Subsequent to accessing the network, the terminal device can provide mapping information between the IPsec SA and the NSI to the wireless access point so that the IPsec SA data traffic can be forwarded in the corresponding NSI. The above technical solution makes it possible to promote non-3GPP convergence in a 5G network and improve the communication performance of the network architecture.

Referring now to FIG. 1, it illustrates a network environment 100 where example embodiments of the present disclosure can be implemented. The network environment 100 may be a 5G convergence network, including a core network 101 and a Wi-Fi network 102 provided by a wireless access device 110 based on the wireless communication technology.

The core network 101 is configured therein with network slice architecture. As shown in FIG. 1, the network slice architecture includes network slice instances NSI-1, NSI-2 and NSI-3 for supporting services having different network characteristics. The wireless network characteristics may include, but are not limited to, latency budget, transmission bandwidth, a maximum transmission rate of data associated with the NSI, and the like. The examples of the wireless network characteristics may include other performance parameters or indicators, which will not be described in detail for brevity.

The wireless network 102 is connected to the core network 101 via an interconnection device 112. The interconnection device 112 may include, but is not limited to, a N3IWF, TNGF or the like. In a circumstance where an untrusted non-3GPP accesses, the wireless access device 110 is connected to the core network 101 via the N3IWF. The N3IWF can support functions including, but not limited to: establishing an IPsec tunnel with a UE; being terminated to the control plane and the user plane of the core network 101 via N2 and N3 interfaces; establishing an IPsec Security Association (IPsec SA) to support PDU session traffic flows; relaying uplink and downlink control plane NAS (N1) signaling between a UE and an AMF; replaying uplink and downlink user plane data traffic between a UE and a UPF, to realize QoS corresponding to data traffic, support AMF selection and the like. Similarly, in a circumstance where a trusted non-3GPP accesses, the wireless access device 110 is connected to the core network 101 via a TNGF.

A terminal device 120 is located within the coverage of the wireless network 102. Upon accessing the wireless network 102, the terminal 120 can use a service supported by one of the NSI-1 through NSI-3 via the wireless network. After being encapsulated, a data plane traffic flow (e.g. a PDU session) from the terminal device 120 is forwarded in the IP sec (Internet Security Protocol) tunnel to a corresponding NSI in the core network 101. Likewise, data from the core network 101 can also be forwarded by a corresponding NSI to the terminal device 120 via the IPsec tunnel.

According to example embodiments of the present disclosure, in order to guarantee network characteristics required by an end-to-end network slice data plane in the convergence network 100, the wireless access device 110 knows information on the network slice architecture in the core network 101. Specifically, a network management device 114 in the wireless network 102 creates and manages (e.g. modifies, updates, deletes, and the like) an NSI management object aligned with the NSI-1 through NSI-3 in the core network 101 on the wireless access device 110. The network management device 114 may be an independent management system located in the cloud, or may be deployed in the core network 101.

As such, the PDU session traffic flow encapsulated via the IPsec SA is not transparent to the Wi-Fi network. The wireless access device 110 can forward data traffic in the corresponding NSI based on a mapping relation with the NSI, the NSI management object and the wireless network characteristics, so as to meet different network characteristics.

In addition, the wireless access network 110 can share 5G slicing information with the terminal device 120. For example, the wireless access device 110 may advertise its network slice capability to all terminal devices within the coverage of the wireless network 102. Therefore, a terminal device can determine whether to access the network, or select from a plurality of wireless networks, based on the information.

It would be appreciated that the network environment 100 as shown in FIG. 1 is described only as an example, without implying any limitation to the scope of the present disclosure. The embodiments of the present disclosure can also be embodied in a different network environment or architecture. Besides, the number of devices and the number of slices as shown in FIG. 1 are depicted only exemplarily, without limitation. In actual applications, there may be any number of devices or slices depending on the network scale, network resources and network characteristics of a service.

Further, it is to be understood that the network environment 100 further includes other elements, entities or network functions for implementing communication, such as an AMF (Access and Mobility Management Function), SMF (Session Management Function), UPF (User Plane Function), and the like. Those elements or functions may be physical or virtual, and can be implemented in any appropriate manner. Moreover, any communication technology currently known or to be developed in the future can be utilized between elements or entities for communication.

Figure 2:
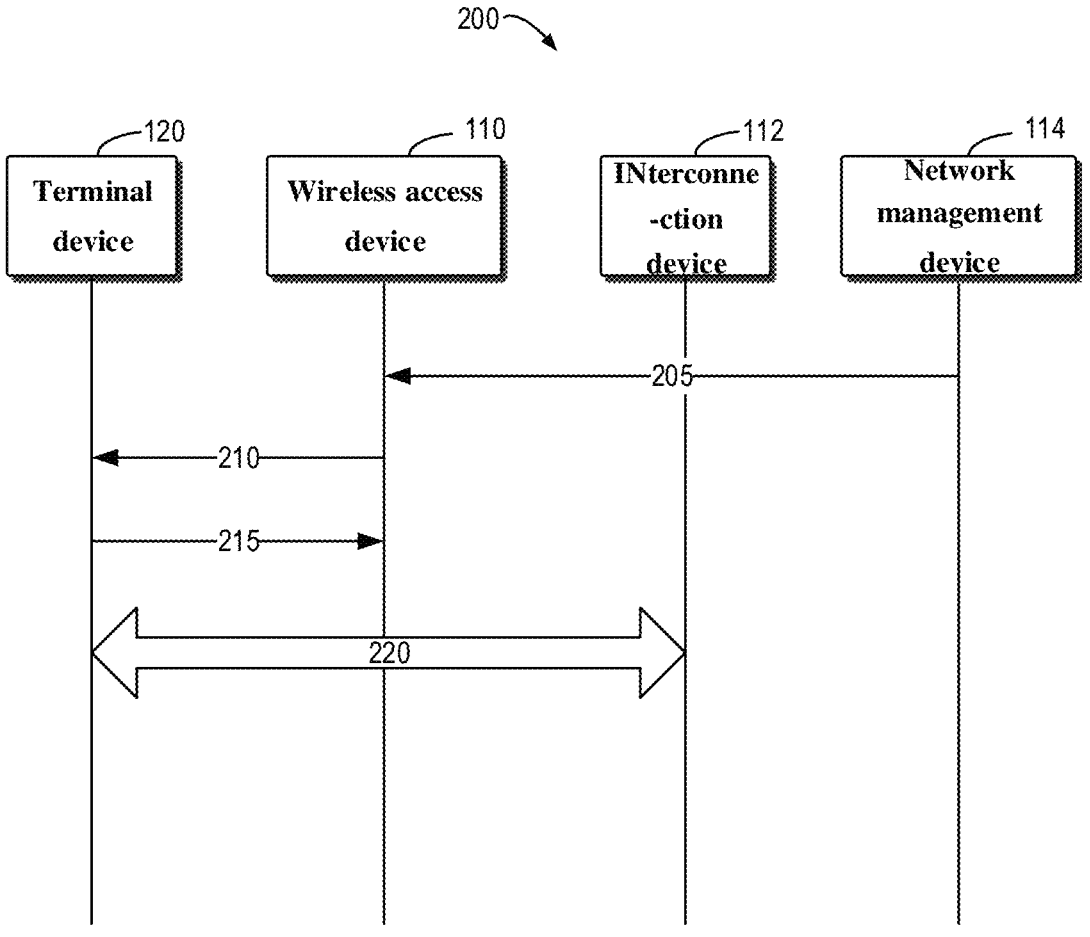
FIG. 2 illustrates a signaling flow of an example interaction process for supporting network slicing in a wireless network according to some embodiments of the present disclosure.

FIG. 2 illustrates a signaling flow of an example interaction process according to some embodiments of the present disclosure. The interaction process 200 can be implemented in the network environment 100, which involves the wireless access device 110, the terminal device 120, the interconnection device 112, and the network management device 114 as shown in FIG. 1. It would be appreciated that, although the process 200 is described with reference to FIG. 1 for ease of discussion, the process shown in FIG. 2 is also applicable to other communication scenarios.

In the process 200, the network management device 114 configures (205) an NSI management object aligned with the NSI-1 through NSI-3 in the core network 101 on the wireless access device 110. In some example embodiments, configuring performed by the network management device 114 for the wireless access device 110 may include, for example, creating, deleting, modifying, or updating an NSI management object.

Table 1 shows configuring an NSI management object on the wireless access device 110. The NSI-SST and NSI-SD in the NSI management object are configured with the same value as the NSI in the core network 101, to thus form an E2E network slice in the 5G convergence network. The NSI-SST may be set as an SST value defined according to the related 3GPP standards, or may be a customized value for an extended service type. In some example embodiments, the wireless network 102 may specify an NSI as the default NSI.

Optional parameters related to bandwidth and latency may be network characteristic information of the NSI. By setting those parameters, the wireless access device 110 can reserve resources for the NSI accordingly.

access device 110, the end-to-end network slicing function can be supported.

Then, the wireless access device 110 can advertise (210) NSI capability information to the wireless network 102. The IEEE 802.11 standard defines the Access Network Query Protocol (ANQP) which intends to allow a UE client, such as the terminal device 120, to query access network information from the wireless access device 110. According to the IEEE 802.11 related specifications, one ANQP element with name of the core network 110 is defined to support queries about Public Land Mobile Network (PLMN) list information, so as to obtain those PLMNs which are interconnecting with the current wireless network 102.

In order to support NSI capability advertisement of the wireless network 102, the ANQP query information element for a 3GPP Cellular Network query can be extended. Table 2 shows an example extension to the ANQP query element, to cover the NSI SST and NSI SD information in the query response.

TABLE 2

NSI extension to ANQP query message

| Information element (IE) | Present (M/O) | Description |
|---|---|---|
| NSI-IEI | M | NSI information element ID, 00000100 |
| Length of NSI list contents | M | Length of NSI list contents |
| Number of NSIs | M | Number of NSIs |
| NSI SST and NSI SD of NSI-1 | O | NSI SST and NSI SD of NSI-1 |
| NSI SST and NSI SD of NSI-2 | O | NSI SST and NSI SD of NSI-2 |
| NSI SST and NSI SD of NSI-3 | O | NSI SST and NSI SD of NSI-3 |
| . . . | . . . | . . . |

In some example embodiments, if the number of NSIs is zero, it is indicated that the wireless network 102 does not support the network slicing function. If the number of NSIs is not zero, it is indicated that the network slicing function is supported, and in this case, the wireless access device 110 can send information related to the NSIs in the ANQP query response to the terminal device 120.

As stated above, the terminal device 120 can select the wireless network 102 based on the received NSI capability advertisement.

Thereafter, the terminal device 120 accessed the wireless network 102 can establish an IPsec SA session between the

TABLE 1

NIS management object for wireless access network

| Information Element (IE) | Present (M/O) | Description |
|---|---|---|
| NSI-SST | M | Network slice instance-slice service type |
| NSI-SD | O | Network slice instance-slice differentiator |
| Maximum bit rate (Mbps) | O | Maximum bit rate for both upstream and downstream |
| Guaranteed bit rate (Mbps) | O | Guaranteed bit rate for both upstream and downstream |
| Latency budget (ms) | O | Maximum latency of data flows |

The protocol for managing the NSI management object may be vendor implementation specific, for example, which may be the standard gateway management protocol, such as TR069 or TR369, or which may be some customized management protocols. By configuring an NSI management object aligned with the core network 101 on the wireless interconnection device 112, such as an N3IWF/TNGF or the like, and the terminal device 120 to carry a data plane QoS flow in the non-3GPP Wi-Fi network. In addition, the terminal device 130 can send, to the wireless access device 110, mapping information between the wireless access device 110 and the interconnection device 112.

In some example embodiments, a new IE may be used to update the mapping information between the terminal device 120 and the wireless access device 110. The IE may be referred to as IPsec mapping information element. Table 3 below shows the IPsec mapping information IE.

core network 101, or may include data sent from the core network 101 to the terminal device 120. As shown in FIG. 2, the forwarded data arrive at the core network 101 via the interconnection device 112, or are sent from the core network 101 via the interconnection device 112. Therefore, the

TABLE 3

IPsec mapping information element

| Information element (IE) | Present (M/O) | Description |
|---|---|---|
| IPsec mapping information | M | IPsec mapping information element ID |
| Length of mapping information | O | Length of mapping information |
| Number of mapping elements | O | Number of mapping elements |
| IPsec-SPI | O | IPsec security index (SPI) of first mapping element |
| IPsec-SP2 | O | Peer IPsec SPI of first mapping element |
| IPsec-IPAddr | O | IPsec address of first mapping element |
| IPsec-IPAddr2 | O | Peer IPsec address of first mapping element |
| IPsec-ProtocolID | O | IPsec protocol ID of first mapping element |
| NSI-ST and NSI-SD of NSI | O | NSI-SST and SD of first mapping element |
| Next mapping element | O | Content of next mapping element |

From the perspective of the UE, the new action frame type can be extended to carry the IPsec mapping information element between the terminal device 120 and the wireless access device 110. Accordingly, the IPsec mapping information element can be used between the terminal device 120 and the wireless access device 110 in the wireless network 102 to exchange mapping information. The action frame may be referred to as 3GPP QoS action frame.

The new action frame may be a new action frame type, where its action category value is taken from reserved action codes in the 802.11 specifications. The new action frame may be a new public action frame type, where its common action field value may be taken from reserved action field values in the 802.11 specifications, or a new subtype of a QoS management action frame which is taken from reserved subtype field values defined in the Wi-Fi alliance Wi-Fi QoS management specification.

Once any new IPsec SA is established between the terminal device 120 and the interconnection device 112 (e.g. N3IWF/TNGF), the terminal device 120 sends (215) this 3GPP QoS action frame carrying the IPsec mapping information from the terminal device 120 to a Wi-Fi access device.

In some other example embodiments, a Generic Advertisement Service (GAS)-based public action frame may be reused to carry IPsec mapping information in an ANQP advisement protocol element payload. The GAS-based public action frame may include, for example, a GAS request and a GAS response. In addition, if any new IPsec SA is established between the terminal device 120 and the interconnection device 112, the terminal device 120 may send a GAS query action frame with an ANQP advertisement protocol element. The ANQP query payload piggybacks IPsec mapping information updated from the terminal device 120 to the wireless access device 110.

Subsequently, the wireless access device 110 forwards (220) the data flow passing through the transmission tunnel in the corresponding NSI based on the mapping information, the NSI management object, and wireless network characteristics associated with the NSI.

The data flow passing through the transmission tunnel may include data sent from the terminal device 120 to the wireless access device 110 can identify the mapping information between the IPsec SA and the NSI, and forward the IPsec SA data flow in the corresponding NSI based on the mapping information and the NSI network characteristics. If there is no corresponding NSI in the wireless network, the wireless access device 110 can forward the IPsec SA data flow in the default NSI.

It would be appreciated that the number of information elements and the values as shown in Tables 1 through 3 are provided only as an example, without limitation. Although the respective steps in the interaction process 200 are described in a particular sequence, the sequence is provided merely for illustration, without limitation. Unless indicated otherwise, it should not be construed as requiring that this type of interaction process be completed in the particular sequence as shown above or in a successive sequence. In some circumstances, multi-task or parallel-processing may be advantageous. Moreover, the interaction process 200 may include additional operations not shown and/or may omit one or more operations as shown.

By configuring a management object aligned with the network slice of the core network in the Wi-Fi network, the wireless access device 110 can implement wireless medium access scheduling within a Wi-Fi access device and across a plurality of Wi-Fi access devices. Based on the network characteristics of the created network slice, the wireless access device 110 can correspondingly schedule wireless medium accesses, so as to provide a service with an expected bandwidth and latency for a specific network slice. Based on the above mechanism, the non-3GPP convergence network can support the 5G network slicing function, and a 5G data plane PDU session can be mapped into a network slice in a wireless network. In this way, the end-to-end network characteristics of the network slices in the non-3GPP convergence 5G network across the wireless access network and the 5G core network can be ensured.

FIG. 3 illustrates a flowchart of a method 300 for communication according to some embodiments of the present disclosure. The method 300 can be implemented at the wireless access device 110 as shown in FIG. 1. For ease of discussion, reference will be made to FIG. 1 below to describe the method 300 from the perspective of the wireless access device 110.

As shown in FIG. 3, at 310, the wireless access device 110 acquires an NSI management object corresponding to a network slice instance NSI (e.g., NSI-1, NSI-2 and NSI-3) managed by the core network 101. The NSI management object may include wireless network characteristics associated with the NSI.

The wireless network characteristics may include, but are not limited to, latency budget, transmission bandwidth, a maximum transmission rate of the data associated with the NSI, and the like. The examples of the wireless network characteristics may include other performance parameters or indicators, which will not be described in detail for brevity.

The NSI management object may be created, modified or deleted by the network management device 114. In some example embodiments, the NSI management object may further include an NSI-SST and an NSI-SD corresponding to the NSI managed by the core network 101.

In some example embodiments, the wireless access device 110 may reserve resources of the wireless network 102 for the NSI.

At 320, the wireless access device 110 advertises the NSI capability information to the terminal device 120 in the wireless network 102 provided to the wireless access device 110. The NSI capability information may indicate whether the wireless network 102 supports the network slicing function.

The wireless access device 110 can advertise its NSI capability information to the terminal device within the wireless network via a message based on the ANQP. As an example, the wireless access device 110 receives a query message based on the ANQP from the terminal device 120. The wireless access device 110 generates a query response message based on the ANQP, where the query response message can indicate a number of NSIs supported by the wireless network. In response, the wireless access device 110 sends the query response message to the terminal device 120.

In some example embodiments, if the number of NSIs is zero, it is indicated that the wireless network 102 does not support the network slicing function. If the number of NSIs is not zero, it is indicated that the wireless network 102 supports the network slicing function. Accordingly, in some example embodiments, the terminal device 120 can determine whether to access the wireless network based on the NSI capability information advertised by the network. The values of zero and non-zero are only example settings for indicating the network slicing capability. In actual applications, any suitable indicator or value may be employed to differentiate different network slicing capabilities, which will not be described in detail for brevity.

In the case of the NSI capability information indicates that the wireless network 102 supports the network slicing function, the query response message may further include an NSI-SST and an NSI-SD corresponding to the NSI supported by the wireless network 102.

At 330, the wireless access device 110 receives, from the terminal device 120, mapping information on the NSI and the transmission tunnel between the terminal device 120 and the core network 101.

The mapping information may be included in an IPsec-based IE. As an example, the IPsec-based IE may be a QoS action frame. As a further example, the IPsec-based IE may include a GAS request and a GAS response action frame. Certainly, the mapping relation may be based on other network protocols and transmitted in any suitable signaling or format, which will not be described in detail for brevity.

At 340, the wireless access device 110 forwards the data passing through the transmission tunnel in the corresponding NSI based on the mapping information, the NSI management object and the wireless network characteristics associated with the NSI. The forwarded data include data sent from the terminal device 120 to the core network 101 and the data sent from the core network 101 to the terminal device 120.

In some example embodiments, the wireless access device 110 may listen to the traffic flow from the terminal device 120, and acquire mapping information between the IPsec SA and the NSI. In this way, upon receiving data traffic from the terminal device 120, if there is a corresponding NSI management object on the wireless access device 110, the wireless access terminal device 110 forwards the data traffic to the corresponding NSI in the core network based on the wireless network characteristics associated with the corresponding NSI. If there is no corresponding NSI management object, the wireless access device 110 forwards the data traffic based on the wireless network characteristics associated with the default NSI in the wireless network 102.

Likewise, upon receiving data traffic from the core network 101, if there is a corresponding NSI management object on the wireless access device 110, the wireless access device 110 forwards the data traffic in the corresponding NSI to the terminal device 120 based on the wireless network characteristics associated with the corresponding NSI. If there is no corresponding NSI management object, the wireless access device 110 may forward the data traffic to the terminal device 120 based on the wireless network characteristics associated with the default NSI in the wireless network 102.

FIG. 4 illustrates a flowchart of a method 400 for communication according to some embodiments of the present disclosure. The method 400 may be implemented at the terminal device 120 as shown in FIG. 1. For ease of discussion, reference below will be made to FIG. 1 to describe the method 400 from the perspective of the terminal device 120.

As shown in FIG. 4, at 410, the terminal device 120 in the wireless network 102 receives Network Slice Instance (NSI) capability information advertised by a wireless access device 210. The NSI capability information may at least indicate whether the wireless network 102 supports the network slicing function.

In some example embodiments, the NSI capability information may be transmitted based on an Access Network Query Protocol (ANQP). The terminal device 120 sends a query message based on the ANQP to the wireless access device 210. In response, the terminal device 120 receives a query response message based on the ANQP from the wireless access device 210. The query response message may indicate a number of NSIs supported by the wireless network 102.

In some example embodiments, if the number of NSIs is zero, it is indicated that the wireless network 102 does not support the network slicing function. If the number of NSIs is not zero, it is indicated that the wireless network 102 supports the network slicing function. Therefore, in some example embodiments, the terminal device 120 can determine, based on the NSI capability information advertised by the network, whether to access the wireless network. The values of zero and non-zero are only example settings for indicating the network slicing capability. In actual applications, any suitable indicator or value may be employed to differentiate different network slicing capabilities, which will not be described in detail for brevity.

When the NSI capability information indicates that the wireless network 102 supports the network slicing function, the query response message may also include an NSI-SST and an NSI-SD corresponding to the NSI supported by the wireless network 102.

At 420, the terminal device 120 sends, to the wireless access device 110, mapping information on the NSI and the transmission tunnel between the terminal device 120 and the core network 101. The NSI has associated wireless network characteristics.

The wireless network characteristics may include, but are not limited to, latency budget, transmission bandwidth, a maximum transmission rate of data associated with the NSI, and the like. Certainly, the examples of the wireless network characteristics may further include other performance parameters or indicators, which will not be described in detail for brevity.

The mapping information may indicate a mapping relation between IPsec identification information and the NSI. As an example, the IPsec-based IE may include a QoS action frame. As another example, the IPsec-based IE may include a GAS request and a GAS response action frame. Certainly, the mapping information may be based on other network protocols and transmitted in any suitable signaling or format, which will not be described in detail for brevity.

At 430, the terminal device 120 sends the data to be forwarded to the core network 101 in the NSI to the wireless access device 110 via the transmission tunnel. In addition or alternatively, the terminal device 120 receives the data forwarded from the core network 101 in the corresponding NSI from the wireless access device 110 via the transmission tunnel.

In some example embodiments, after the transmission tunnel is established between the terminal device 120 and the core network 101, the terminal device 120 may send the mapping information to the wireless access device 210. For example, in response to the transmission tunnel being established, the terminal device 120 triggers transmission of the mapping information.

According to example embodiments of the present disclosure, there is provided a mechanism of supporting network slicing in a wireless network. In the mechanism, by creating and managing an NSI management object aligned with the core network on a wireless access point, the wireless access point can reserve network resources based on NSI network characteristics. As such, an end-to-end slicing solution can be attained, to meet requirements of different services on service quality, latency, transmission bandwidth, and the like. In addition, the wireless access point can advertise its slicing capability information to a terminal device in the wireless network. In the way, the terminal device can select, based on the slicing capability information, a wireless network to be accessed. After accessing the network, the terminal device may provide mapping information between the IPsec SA and the NSI to the wireless access point, so that an IPsec SA data traffic can be forwarded in the corresponding NSI. With the mechanism, it is possible to promote non-3GPP convergence in a 5G network and improve the communication performance of the network architecture.

In some example embodiments, the methods 300 and 400 described above with reference to FIGS. 3 and 4 may be performed by components for performing respective steps in the methods 300 and 400. Those components may be implemented in any suitable form. For example, the components may be implemented in circuitry or a software module.

Figure 5:
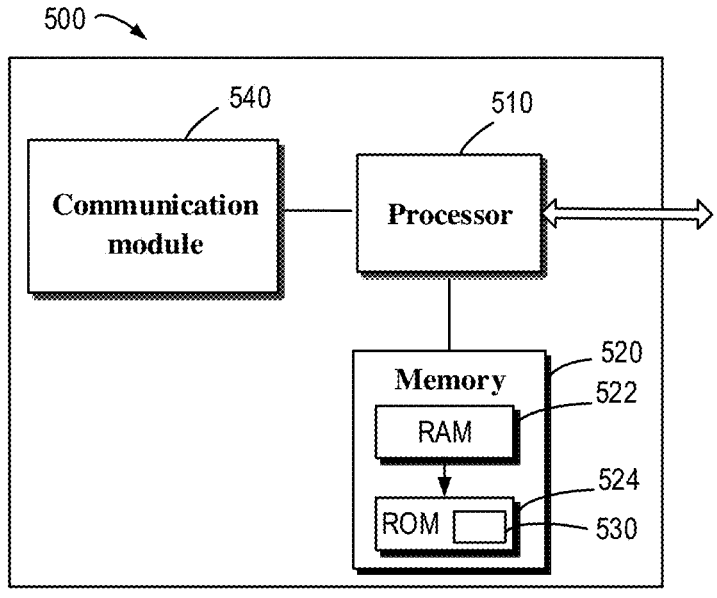
FIG. 5 illustrates a block diagram of a device adapted to implement some embodiments of the present disclosure.

FIG. 5 illustrates a block diagram of a device 500 adapted to carry out example embodiments of the present disclosure. The device 500 may be implemented at the wireless access device 110, the terminal device 120 or the network management device 114 as shown in FIG. 1, or a part thereof. As shown in FIG. 5, the device 500 includes at least one processor 510, at least one memory 520 coupled to the memory 510, a communication module 540 coupled to the processor 510 and a communication interface (not shown) coupled to the communication module 540. The memory 520 at least stores a computer program 530.

The communication module 540 is used for bi-direction communication. The communication module 540 includes at least one antenna for facilitating communication. The communication interface may represent any interface necessary for communication.

By executing instructions, the processor 510 causes the device 500 to perform related operations and features of the wireless access device 110, the terminal device 120 and the network management device 114 as described above with reference to FIGS. 2 through 4. As an example, by executing instructions, the function of supporting network slicing in a wireless network can be performed on the wireless access device 110. All the features described above with reference to FIGS. 2 through 4 are all applicable to the device 500, which will not be described herein for brevity.

The processor 510 may be of any suitable type applicable to the local technical environment, and may include one or more of the following: a general-purpose computer, a special-purpose computer, a microprocessor, a digital signal controller (DSP), and a processor based on multi-core processor architecture. The device 500 may include a plurality of processors, such as dedicated integrated circuit chips that are temporally slaved to a clock of a synchronized master processor.

The memory 520 may include one or more non-volatile memories, and one or more volatile memories. The examples of the non-volatile memory include, but are not limited to, a Read-Only Memory (ROM) 524, Electrically Programmable Read-Only Memory (EPROM), flash memory, hard disk, Compact Disk (CD), Digital Video Disk (DVD), and other magnetic storage device and/or optical storage device. The examples of the volatile memory include, but are not limited to, a Random Access Memory (RAM) 522, and other volatile memory not maintained during power down.

The computer program 530 includes computer-executable instructions executed by the associated processor 510. The program 530 may be stored on the ROM 524. The processor 510 may load the program 530 into the RAM 522 to perform any appropriate action and processing.

The embodiments of the present disclosure may be implemented by means of the program 530, so that the device 500 can perform any process discussed herein with reference to FIGS. 2 through 4. The example embodiments of the present disclosure can also be implemented by hardware or a combination of software and hardware.

Figure 6:
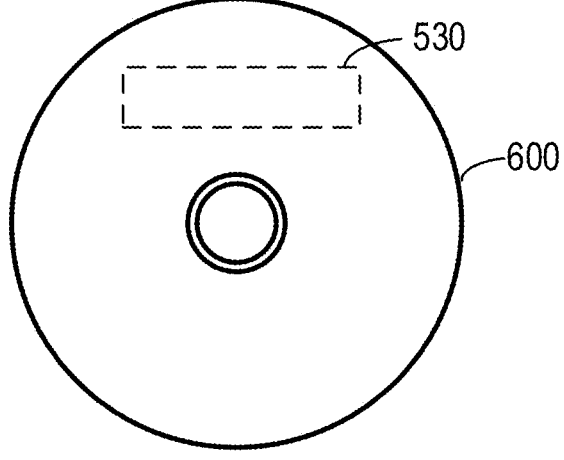
FIG. 6 illustrates a block diagram of an example computer readable medium according to some embodiments of the present disclosure.

In some example embodiments, the program 530 may be tangibly covered in a computer readable medium that may be included in the device 500 (e.g. memory 520) or other storage device accessible for the device 500. The device 500 can load the program 530 from the computer readable medium to the RAM 522 for execution. The computer readable medium may include any type of tangible non-volatile memory, such as a ROM, EPROM, flash memory, hard disk, CD, DVD, and the like. FIG. 6 illustrates an example of a computer readable medium 600 in the form of CD or DVD. The computer readable medium has the program 530 stored thereon.

In general, various example embodiments of the present disclosure can be implemented in hardware or a dedicated circuit, software, logic or any combination thereof. Some aspects can be implemented in hardware while some other aspects can be carried out in firmware or software executed by a controller, microprocessor or other computing device. When the respective aspects of the embodiments of the present disclosure are depicted or described as block diagrams, flowcharts or some other graphic representations, it would be appreciated that the blocks, apparatuses, systems, techniques or methods described here may, by way of a non-limiting example, be implemented in hardware, software, firmware, dedicated circuits or logic, general hardware or a controller or other computing device, or a combination of some of them.

The present disclosure further provides at least one computer program product tangibly stored on a non-transitory computer-readable storage medium. The computer program product includes computer-executable instructions, for example, those included in a program module and executed in a device on a real or virtual processor of a target to implement the method as described above with reference to FIGS. 2 through 4. Generally speaking, program modules include routines, programs, libraries, objects, categories, components, data structures and the like, which perform particular tasks or implement particular abstract data structures. In various example embodiments, the functionalities of program modules can be merged or split among the program modules described here. Machine-executable instructions for program modules can be performed within a local or distributed device. In a distributed device, the program modules can be located in both of a local and a remote storage medium.

Computer program codes for carrying out the method of the present disclosure may be programed using one or more programming languages. Those computer program codes can be provided to a general purpose computer, a special purpose computer, or processors of other programmable data processing devices, so as to cause the functions/operations specified in the flowchart and/or block diagram to be implemented when executed by a computer or other programmable data processing device. The program codes may be executed entirely on the computer, partly on the computer, as a stand-alone software package, partly on the computer and partly on a remote computer or entirely on the remote computer or server.

In the context of the present disclosure, the computer program codes or related data may be carried by any appropriate carrier, so that the device, apparatus or processor can perform various processing and operations as described above. The examples of the carrier may include a signal, computer readable medium, and the like.

The examples of the signal may include: an electrical, optical, radio or acoustic signal, or a signal propagated in other form, such as a carrier wave, infrared signal, or the like.

The computer-readable medium may be a computer-readable signal medium or computer-readable storage medium. The computer readable medium may include, but is not limited to, an electronic, magnetic, optical, electromagnetic, infrared or semiconductor system, apparatus or device, or any suitable combination thereof. More specific examples of the computer-readable storage medium include an electrical connection with one or more wires, portable computer disk, hard disk, Random-Access Memory (RAM), Read-Only Memory (ROM), Erasable Programmable Read-Only Memory (EPROM or flash memory), optical fiber, portable optical disc Read-Only Memory (CD-ROM), optical storage device, magnetic storage device, or any suitable combination thereof.

In addition, although the operations are depicted in a specific order, it should not be construed as requiring that such operations be completed in the specific order as shown or in a successive order, or the operations as shown be all implemented to achieve the desired result. In some circumstances, multitask or parallel processing may be beneficial. Likewise, although the discussion above covers some specific implementation details, this should be understood as description on specific embodiments for a specific invention, rather than limiting scope of any invention or claims. Certain features described in the contexts of separate embodiments described herein may be implemented in combination in a single embodiment. Conversely, various features described in a context of a single embodiment can be implemented separately in multiple embodiments or in any appropriate sub-combination.

Although the subject matter has been described in language specific to structural features and/or method operations, it is to be understood that the subject matter specified in the appended claims is not necessarily limited to the specific features or operations described above. Rather, the specific features and operations described above are disclosed in form of the example implementing the claims.

Description has been made to various example embodiments of the technology. As an alternative or supplement to the above, the following examples will be described. The features described below in any one of examples can be used with any one of other examples described herein.

Example 1: a wireless access device, comprising: at least one processor; and at least one memory having computer program codes, the at least one memory and the computer program codes being configured, together with the at least one processor, to cause the wireless access device to: acquire a Network Slice Instance (NSI) management object corresponding to an NSI managed by a core network, the NSI management object having wireless network characteristics associated with the NSI; advertise NSI capability information to a terminal device in a wireless network provided to the wireless access device, the NSI capability information at least indicating whether the wireless network supports a network slicing function; receive, from the terminal device, mapping information on the NSI and a transmission tunnel between the terminal device and the core network; and forward, based on the mapping information, the NSI management object, and the wireless network characteristics associated with the NSI, data passing through the transmission tunnel in the corresponding NSI.

Example 2: the wireless access device of Example 1, wherein the wireless network characteristics comprise at least one of a latency budget, a transmission bandwidth, and a maximum transmission rate associated with the NSI.

Example 3: the wireless access device of Example 1, wherein the NSI management object further comprises a Slice/Service Type (NSI-SST) and a Slice Differentiator (NSI-SD) corresponding to the NSI managed by the core network.

Example 4: the wireless access device of Example 1, wherein the at least one memory and the computer program codes are configured, together with the at least one processor, to cause the wireless access device to: reserve, based on the wireless network characteristics, resources of the wireless network for the NSI.

Example 5: the wireless access device of Example 1, wherein the at least one memory and the computer program codes are configured, together with the at least one processor, to cause the wireless access device to advertise the NSI capability information by: receiving a query message based on an Access Network Query Protocol (ANQP) from the terminal device; generating a query response message based on the ANQP, the query response message at least indicating a number of NSIs supported by the wireless network; and sending the query response message to the terminal device.

Example 6: the wireless access device of Example 5, wherein, if a number of the NSIs is zero, it is indicated that the wireless network does not support a network slicing function, and if a number of the NSIs is not zero, it is indicated that the wireless network supports the network slicing function.

Example 7: the wireless access device of Example 6, wherein the NSI capability information indicates that the wireless network supports the network slicing function, and the query response message further comprises a Slice/Service Type (NSI-SST) and a Slice Differentiator (NSI-SD) corresponding to the NSI supported by the wireless network.

Example 8: the wireless access device of Example 1, wherein the NSI management object is created, deleted or modified by an access network management device.

Example 9: the wireless access device of Example 1, wherein the mapping information indicates a mapping relation between identification information based on an Internet Protocol Security (IPsec) and the NSI.

Example 10: the wireless access device of Example 9, wherein the mapping information is included in a Quality of Service (QoS) action frame.

Example 11: the wireless access device of Example 9, wherein the mapping information is included in a Generic Advertisement Service (GAS) request and a GAS response action frame.

Example 12: the wireless access device of Example 1, wherein the data passing through the transmission tunnel comprise at least one of data sent from the terminal device to the core network and data sent from the core network to the terminal device.

Example 13: the wireless access device of Example 1, wherein the at least one memory and the computer program codes are configured, together with the at least one processor, to cause the wireless access device to forward the data by: determining, based on the mapping information and the NSI management object, whether there is an NSI management object corresponding to the transmission tunnel in the wireless access device; if there is a corresponding NSI management object, forwarding the data based on wireless network characteristics associated with the corresponding NSI; and if there is no corresponding NSI management object, forwarding the data based on wireless network characteristics associated with a default NSI in the wireless network.

Example 14: a terminal device, comprising: at least one processor; and at least one memory having computer program codes, the at least one memory and the computer program codes being configured, together with the at least one processor, to cause the terminal device to: receive, in a wireless network, Network Slice Instance (NSI) capability information advertised by a wireless access device, the NSI capability information at least indicating whether the wireless network supports a network slicing function; send, to the wireless access device, mapping information on an NSI and a transmission tunnel between the terminal device and a core network, the NSI having associated wireless network characteristics; and perform at least one of the following via the transmission tunnel: sending, to the wireless access device, data to be forwarded to the core network in the corresponding NSI; and receiving, from the wireless access device, data forwarded from the core network in the corresponding NSI.

Example 15: the terminal device of Example 14, wherein the wireless network characteristics comprise at least one of a latency budget, a transmission bandwidth, and a maximum transmission rate of data associated with the NSI.

Example 16: the terminal device of Example 14, wherein the at least one memory and the computer program codes are configured, together with the at least one processor, to cause the terminal device to receive the NSI capability information by: sending a query message based on an Access Network Query Protocol (ANQP) to the wireless access device; and receiving a query response message based on the ANQP from the wireless access device, the query response message at least indicating a number of NSIs supported by the wireless network.

Example 17: the terminal device of Example 14, wherein, if a number of the NSIs is zero, it is indicated that the wireless network does not support a network slicing function, and if a number of the NSIs is not zero, it is indicated that the wireless network supports the network slicing function.

Example 18: the terminal device of Example 16, wherein the NSI capability information indicates that the wireless network supports the network slicing function, and the query response message further comprises a Slice/Service Type (NSI-SST) and a Slice Differentiator (NSI-SD) corresponding to the NSI supported by the wireless network.

Example 19: the terminal device of Example 14, wherein the mapping information indicates a mapping relation between identification information based on an Internet Protocol Security (IPsec) and the NSI.

Example 20: the terminal device of Example 19, wherein the mapping information is included in a Quality of Service (QoS) action frame.

Example 21: the terminal device of Example 19, wherein the mapping information is included in a Generic Advertisement Service (GAS) request and a GAS response action frame.

Example 22: the terminal device of Example 14, wherein the at least one memory and the computer program codes are configured, together with the at least one processor, to cause the terminal device to send the mapping information by: in response to the transmission tunnel between the terminal device and the core network being established, sending the mapping information to the wireless access device.

Example 23: the terminal device of Example 14, wherein the at least one memory and the computer program codes are configured, together with the at least one processor, to cause the terminal device to: determine, based on the NSI capability information, whether to access the wireless network.

We claim:

1. A wireless access device, comprising:
at least one processor; and
at least one memory having computer program codes,
the at least one memory and the computer program codes being configured, together with the at least one processor, to cause the wireless access device to
acquire a Network Slice Instance (NSI) management object corresponding to an NSI managed by a core network, the NSI management object having wireless network characteristics associated with the NSI;

advertise NSI capability information to a terminal device in a wireless network provided to the wireless access device, the NSI capability information at least indicating whether the wireless network supports a network slicing function;

receive, from the terminal device, mapping information on the NSI and a transmission tunnel between the terminal device and the core network; and forward, based on the mapping information, the NSI management object, and the wireless network characteristics associated with the NSI, data passing through the transmission tunnel in the corresponding NSI.

2. The wireless access device of claim 1, wherein the wireless network characteristics comprise at least one of a latency budget, a transmission bandwidth, and a maximum transmission rate associated with the NSI.

3. The wireless access device of claim 1, wherein the NSI management object further comprises a Slice/Service Type (NSI-SST) and a Slice Differentiator (NSI-SD) corresponding to the NSI managed by the core network.

4. The wireless access device of claim 1, wherein the at least one memory and the computer program codes are configured, together with the at least one processor, to cause the wireless access device to:

reserve, based on the wireless network characteristics, resources of the wireless network for the NSI.

5. The wireless access device of claim 1, wherein the at least one memory and the computer program codes are configured, together with the at least one processor, to cause the wireless access device to advertise the NSI capability information by:

receiving a query message based on an Access Network Query Protocol (ANQP) from the terminal device;

generating a query response message based on the ANQP, the query response message at least indicating a number of NSIs supported by the wireless network; and sending the query response message to the terminal device.

6. The wireless access device of claim 5, wherein, in response to the number of the NSIs being zero, then the wireless network does not support the network slicing function, and in response to the number of the NSIs not being zero, then the wireless network supports the network slicing function.

7. The wireless access device of claim 6, wherein the NSI capability information indicates that the wireless network supports the network slicing function, and the query response message further comprises a Slice/Service Type (NSI-SST) and a Slice Differentiator (NSI-SD) corresponding to the NSI supported by the wireless network.

8. The wireless access device of claim 1, wherein the NSI management object is created, deleted or modified by a network management device.

9. The wireless access device of claim 1, wherein the mapping information indicates a mapping relation between identification information based on an Internet Protocol Security (IPsec) and the NSI.

10. The wireless access device of claim 9, wherein the mapping information is included in a Quality of Service (QoS) action frame.

11. The wireless access device of claim 9, wherein the mapping information is included in a Generic Advertisement Service (GAS) request and a GAS response action frame.

12. The wireless access device of claim 1, wherein the data passing through the transmission tunnel comprise at least one of data sent from the terminal device to the core network and data sent from the core network to the terminal device.

13. The wireless access device of claim 1, wherein the at least one memory and the computer program codes are configured, together with the at least one processor, to cause the wireless access device to forward the data by:

determining, based on the mapping information and the NSI management object, whether there is an NSI management object corresponding to the transmission tunnel in the wireless access device;

in response to there being a corresponding NSI management object, forwarding the data based on wireless network characteristics associated with the corresponding NSI; and in response to there being no corresponding NSI management object, forwarding the data based on wireless network characteristics associated with a default NSI in the wireless network.

14. A terminal device, comprising:

at least one processor; and at least one memory having computer program codes, the at least one memory and the computer program codes being configured, together with the at least one processor, to cause the terminal device to receive, in a wireless network, Network Slice Instance (NSI) capability information advertised by a wireless access device, the NSI capability information at least indicating whether the wireless network supports a network slicing function;

send, to the wireless access device, mapping information on an NSI and a transmission tunnel between the terminal device and a core network, the NSI having associated wireless network characteristics; and perform at least one of the following via the transmission tunnel:

sending, to the wireless access device, data to be forwarded to the core network in the corresponding NSI; and receiving, from the wireless access device, data forwarded from the core network in the corresponding NSI.

15. The terminal device of claim 14, wherein the wireless network characteristics comprise at least one of a latency budget, a transmission bandwidth, and a maximum transmission rate of data associated with the NSI.

16. The terminal device of claim 14, wherein the at least one memory and the computer program codes are configured, together with the at least one processor, to cause the terminal device to receive the NSI capability information by:

sending a query message based on an Access Network Query Protocol (ANQP) to the wireless access device; and receiving a query response message based on the ANQP from the wireless access device, the query response message at least indicating a number of NSIs supported by the wireless network.

17. The terminal device of claim 16, wherein, in response to the number of the NSIs being zero, then the wireless network does not support the network slicing function, and in response to the number of the NSIs not being zero, then the wireless network supports the network slicing function.

18. The terminal device of claim 17, wherein the NSI capability information indicates that the wireless network supports the network slicing function, and the query response message further comprises a Slice/Service Type (NSI-SST) and a Slice Differentiator (NSI-SD) corresponding to the NSI supported by the wireless network.

19. The terminal device of claim 14, wherein the mapping information indicates a mapping relation between identification information based on an Internet Protocol Security (IPsec) and the NSI.

20. The terminal device of claim 19, wherein the mapping information is included in a Quality of Service (QoS) action frame.

21. The terminal device of claim 19, wherein the mapping information is included in a Generic Advertisement Service (GAS) request and a GAS response action frame.

22. The terminal device of claim 14, wherein the at least one memory and the computer program codes are configured, together with the at least one processor, to cause the terminal device to send the mapping information by:

in response to the transmission tunnel between the terminal device and the core network being established, sending the mapping information to the wireless access device.

23. The terminal device of claim 14, wherein the at least one memory and the computer program codes are configured, together with the at least one processor, to cause the terminal device to:

determine, based on the NSI capability information, whether to access the wireless network.

24. A method for communication, comprising:

acquiring, at a wireless access device, a Network Slice Instance (NSI) management object corresponding to an NSI managed by a core network, the NSI management object having wireless network characteristics associated with the NSI;

advertising NSI capability information to a terminal device in a wireless network provided to the wireless access device, the NSI capability information at least indicating whether the wireless network supports a network slicing function;

receiving, from the terminal device, mapping information on the NSI and a transmission tunnel between the terminal device and the core network; and forwarding, based on the mapping information, the NSI management object, and the wireless network characteristics associated with the NSI, data passing through the transmission tunnel in the corresponding NSI.

* * * * *